United States Patent
Subramanian et al.

(10) Patent No.: US 10,097,321 B2
(45) Date of Patent: Oct. 9, 2018

(54) COOPERATIVE TECHNIQUES BETWEEN LOWER-FREQUENCY CARRIERS AND MILLIMETER-WAVE CHANNELS FOR DISCOVERY AND SYNCHRONIZATION AND BEAMFORMING

(71) Applicant: QUALCOMM Incorporated, San Diego, CA (US)

(72) Inventors: Sundar Subramanian, Bridgewater, NJ (US); Junyi Li, Chester, NJ (US); Ashwin Sampath, Skillman, NJ (US)

(73) Assignee: QUALCOMM Incorporated, San Diego, CA (US)

(*) Notice: Subject to any disclaimer, the term of this patent is extended or adjusted under 35 U.S.C. 154(b) by 173 days.

(21) Appl. No.: 14/273,421

(22) Filed: May 8, 2014

(65) Prior Publication Data
US 2015/0326359 A1  Nov. 12, 2015

(51) Int. Cl.
*H04B 7/06* (2006.01)
*H04B 7/08* (2006.01)
(Continued)

(52) U.S. Cl.
CPC ......... *H04L 5/0023* (2013.01); *H04B 7/0617* (2013.01); *H04B 7/086* (2013.01); *H04W 72/042* (2013.01); *H04B 7/0628* (2013.01)

(58) Field of Classification Search
CPC ..... H04L 5/0023; H04B 7/086; H04B 7/0617; H04B 7/0628; H04W 8/005; H04W 72/042
See application file for complete search history.

(56) References Cited

U.S. PATENT DOCUMENTS 8,081,759 B2 * 12/2011 Faccin .................. H04L 9/0844
                                                    380/247
8,095,069 B2 *  1/2012 Maltsev ................. H01Q 3/26
                                                    455/41.2
(Continued)

FOREIGN PATENT DOCUMENTS

WO   2008109525 A1   9/2008
WO   2013086164 A1   6/2013
(Continued)

OTHER PUBLICATIONS

International Search Report and Written Opinion—PCT/US2015/024994—ISAEPO—dated Jun. 23, 2015.
(Continued)

*Primary Examiner* — Asad M Nawaz
*Assistant Examiner* — Kai Chang
(74) *Attorney, Agent, or Firm* — Arent Fox LLP

(57) ABSTRACT

A method, an apparatus, and a computer program product for wireless communication are provided. The apparatus receives first information from a base station, determines, based on the first information, a position of resources for receiving a signal transmitted from a connection point, detects the signal via at least one beam receiving direction based on the resources, determines a beam transmitting direction of the connection point and a beam receiving direction of the UE based on the signal, identifies a beam receiving direction of the connection point based on the beam transmitting direction of the connection point, and provides the connection point with second information based on the beam receiving direction of the connection point, wherein the second information may comprise an intent to establish a millimeter-wave (mmW) link with the connection point, the beam receiving direction of the UE,
(Continued)

and/or the beam transmitting direction of the connection point.

30 Claims, 15 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 9,106,286 B2* | 8/2015 | Agee | .................. | H04B 7/0413 |
| 9,144,047 B2* | 9/2015 | Park | .................. | H04W 56/00 |
| 9,312,931 B2* | 4/2016 | Sato | .................. | H04L 5/0023 |
| 2001/0021182 A1* | 9/2001 | Wakutsu | .............. | H04B 7/086 |
| | | | | 370/344 |
| 2007/0287384 A1 | 12/2007 | Sadri et al. | | |
| 2008/0181180 A1* | 7/2008 | Karaoguz | ............ | H04B 7/0408 |
| | | | | 370/331 |
| 2009/0233549 A1 | 9/2009 | Maltsev et al. | | |
| 2010/0014463 A1* | 1/2010 | Nagai | ................. | H04B 7/0695 |
| | | | | 370/328 |
| 2010/0061334 A1* | 3/2010 | Gault | .................. | H04L 5/0005 |
| | | | | 370/330 |
| 2010/0091892 A1* | 4/2010 | Gorokhov | ............ | H04L 1/0026 |
| | | | | 375/260 |
| 2010/0296401 A1* | 11/2010 | Karaoguz | ........... | H04L 41/0806 |
| | | | | 370/252 |
| 2011/0080898 A1 | 4/2011 | Cordeiro et al. | | |
| 2011/0110340 A1* | 5/2011 | Lakkis | ................. | H04W 74/08 |
| | | | | 370/336 |
| 2011/0176436 A1* | 7/2011 | Swaminathan | ... | H04W 36/0061 |
| | | | | 370/252 |
| 2011/0205969 A1* | 8/2011 | Ahmad | ................ | H04W 16/28 |
| | | | | 370/328 |
| 2011/0292917 A1* | 12/2011 | Fan | ...................... | H04L 5/0023 |
| | | | | 370/336 |
| 2011/0319084 A1* | 12/2011 | Meshkati | ............. | H04W 36/20 |
| | | | | 455/436 |
| 2012/0028588 A1* | 2/2012 | Morioka | .............. | H04B 7/0617 |
| | | | | 455/71 |
| 2012/0052864 A1* | 3/2012 | Swaminathan | ... | H04W 36/0061 |
| | | | | 455/436 |
| 2013/0028246 A1* | 1/2013 | Gonikberg | ............ | H04W 64/00 |
| | | | | 370/338 |
| 2013/0083774 A1* | 4/2013 | Son | .................... | H04W 36/0055 |
| | | | | 370/331 |
| 2013/0235851 A1 | 9/2013 | Abu-Surra et al. | | |
| 2013/0308717 A1* | 11/2013 | Maltsev | ............... | H04B 7/0417 |
| | | | | 375/267 |
| 2014/0171094 A1* | 6/2014 | Noh | ....................... | H04W 40/22 |
| | | | | 455/452.1 |
| 2014/0206406 A1* | 7/2014 | Cordeiro | ............. | H04W 72/046 |
| | | | | 455/501 |
| 2014/0242963 A1* | 8/2014 | Novlan | .................. | H04W 48/16 |
| | | | | 455/418 |
| 2014/0269670 A1* | 9/2014 | Park | ....................... | H04W 56/00 |
| | | | | 370/350 |
| 2014/0328194 A1* | 11/2014 | Sen | ...................... | H04W 72/082 |
| | | | | 370/252 |
| 2015/0040195 A1* | 2/2015 | Park | ....................... | H04W 12/06 |
| | | | | 726/4 |
| 2015/0189561 A1* | 7/2015 | Dayanandan | ......... | H04W 48/16 |
| | | | | 370/312 |
| 2015/0201336 A1* | 7/2015 | Shad | .................... | H04W 16/28 |
| | | | | 455/63.4 |
| 2015/0208310 A1* | 7/2015 | Taneja | ............... | H04W 36/0066 |
| | | | | 370/331 |
| 2015/0215793 A1* | 7/2015 | Siomina | ................. | G01S 5/0205 |
| | | | | 455/456.1 |
| 2015/0222345 A1* | 8/2015 | Chapman | ............. | H04B 7/0617 |
| | | | | 370/332 |
| 2015/0319670 A1* | 11/2015 | Jung | ...................... | H04W 36/14 |
| | | | | 370/331 |
| 2015/0327047 A1* | 11/2015 | Tiirola | .................. | H04W 8/005 |
| | | | | 370/338 |
| 2016/0192379 A1* | 6/2016 | Behravan | .............. | H04W 72/04 |
| | | | | 370/329 |
| 2016/0330011 A1* | 11/2016 | Lee | ....................... | H04L 5/0066 |

FOREIGN PATENT DOCUMENTS

| | | |
|---|---|---|
| WO | 2013086410 A2 | 6/2013 |
| WO | 2014009246 A1 | 1/2014 |
| WO | 2014009250 A1 | 1/2014 |

OTHER PUBLICATIONS

International Preliminary Report on Patentability—PCT/US2015/024994, The International Bureau of WIPO—Geneva, Switzerland, dated Jul. 1, 2016.

\* cited by examiner

COOPERATIVE TECHNIQUES BETWEEN LOWER-FREQUENCY CARRIERS AND MILLIMETER-WAVE CHANNELS FOR DISCOVERY AND SYNCHRONIZATION AND BEAMFORMING

BACKGROUND

Field

The present disclosure relates generally to communication systems, and more particularly, to cooperation between a lower-frequency system and a millimeter-wave (mmW) system to enhance discovery, synchronization, and beamforming between devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives first information from a base station; determines, based on the first information, a position of resources for receiving a signal transmitted from a connection point; detects the signal via at least one beam receiving direction based on the resources; determines a beam transmitting direction of the connection point and a beam receiving direction of the apparatus based on the signal; identifies a beam receiving direction of the connection point based on the beam transmitting direction of the connection point; and provides the connection point with second information based on the beam receiving direction of the connection point, the second information comprising at least one of an intent to establish a millimeter-wave (mmW) link with the connection point, the beam receiving direction of the apparatus, or the beam transmitting direction of the connection point.

In another aspect of the disclosure, the apparatus may be embodied as a connection point that receives first information from a base station; determines, based on the first information, a position of resources for transmitting a signal; transmits the signal via at least one beam transmitting direction based on the resources; and receives second information from a user equipment (UE) in response to the signal, the second information comprising at least one of an intent of the UE to establish a millimeter-wave (mmW) link with the connection point, a beam receiving direction of the UE, or a beam transmitting direction of the connection point determined by the UE.

DETAILED DESCRIPTION

Figure 1:
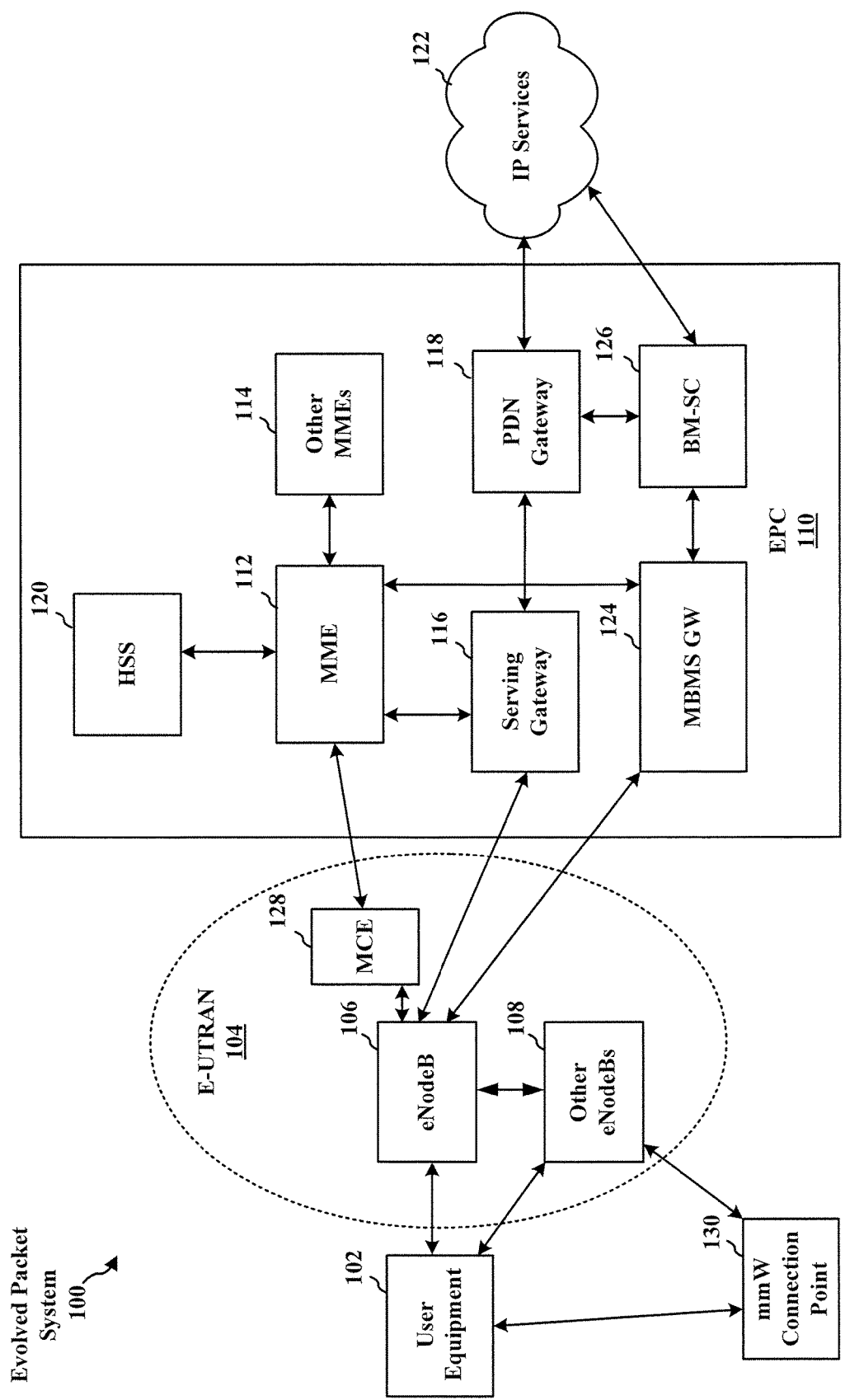
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP 130 may be capable of communicating signals via the LTE network and the mmW system. As such, the CP 130 may be referred to as a LTE+mmW CP. The UE 102 may communicate with the other eNB 108 over a LTE link as well as over a mmW link.

In yet another aspect, the other eNB 108 may be capable of communicating signals via the LTE network and the mmW system, while the CP 130 is capable of communicating signals via the mmW system only. Accordingly, the CP 130 unable to signal the other eNB 108 via the LTE network may communicate with the other eNB 108 over a mmW backhaul link.

Figure 2:
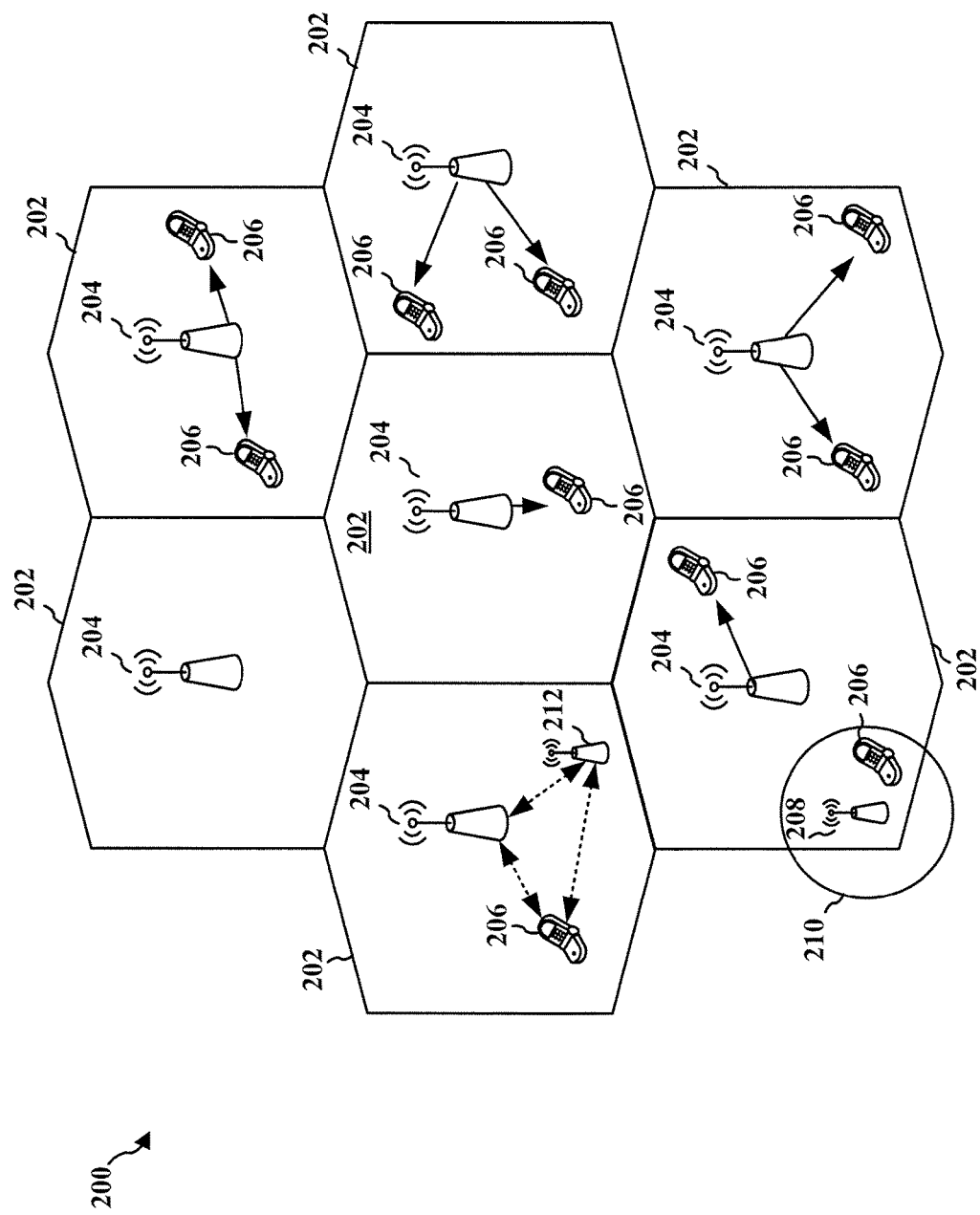
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) 212 (capable of mmW system communication) over a mmW link. In a further aspect, the eNB 204 and the CP 212 may communicate signals via the LTE network and the mmW system. As such, the UE 206 may communicate with the eNB 204 over a LTE link and a mmW link (when the eNB 204 is capable of mmW system communication), or communicate with the CP 212 over a mmW link and a LTE link (when the CP 212 is capable of LTE network communication). In yet another aspect, the eNB 204 communicates signals via the LTE network and the mmW system, while the CP 212 communicates signals via the mmW system only. Accordingly, the CP 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
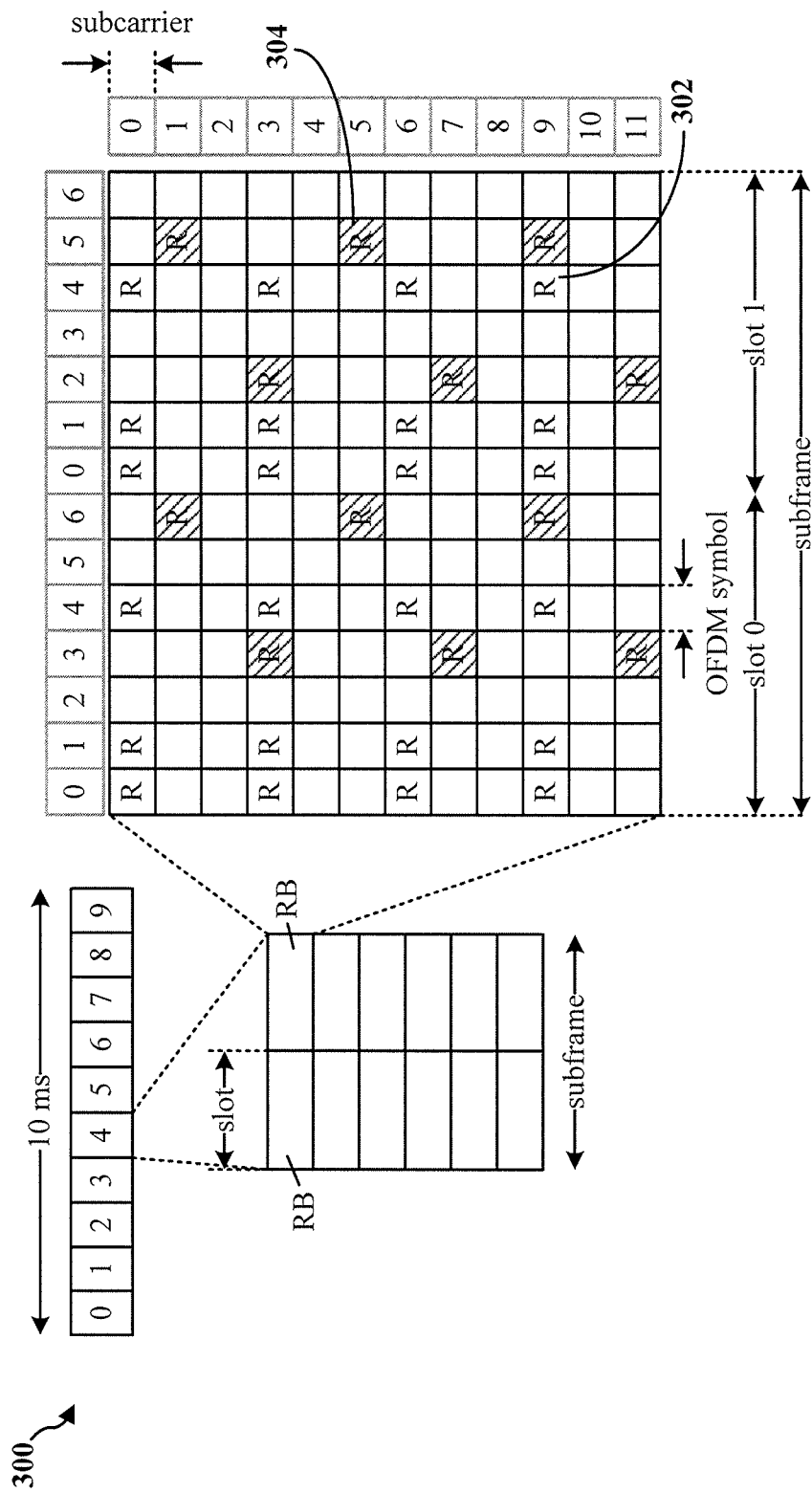
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
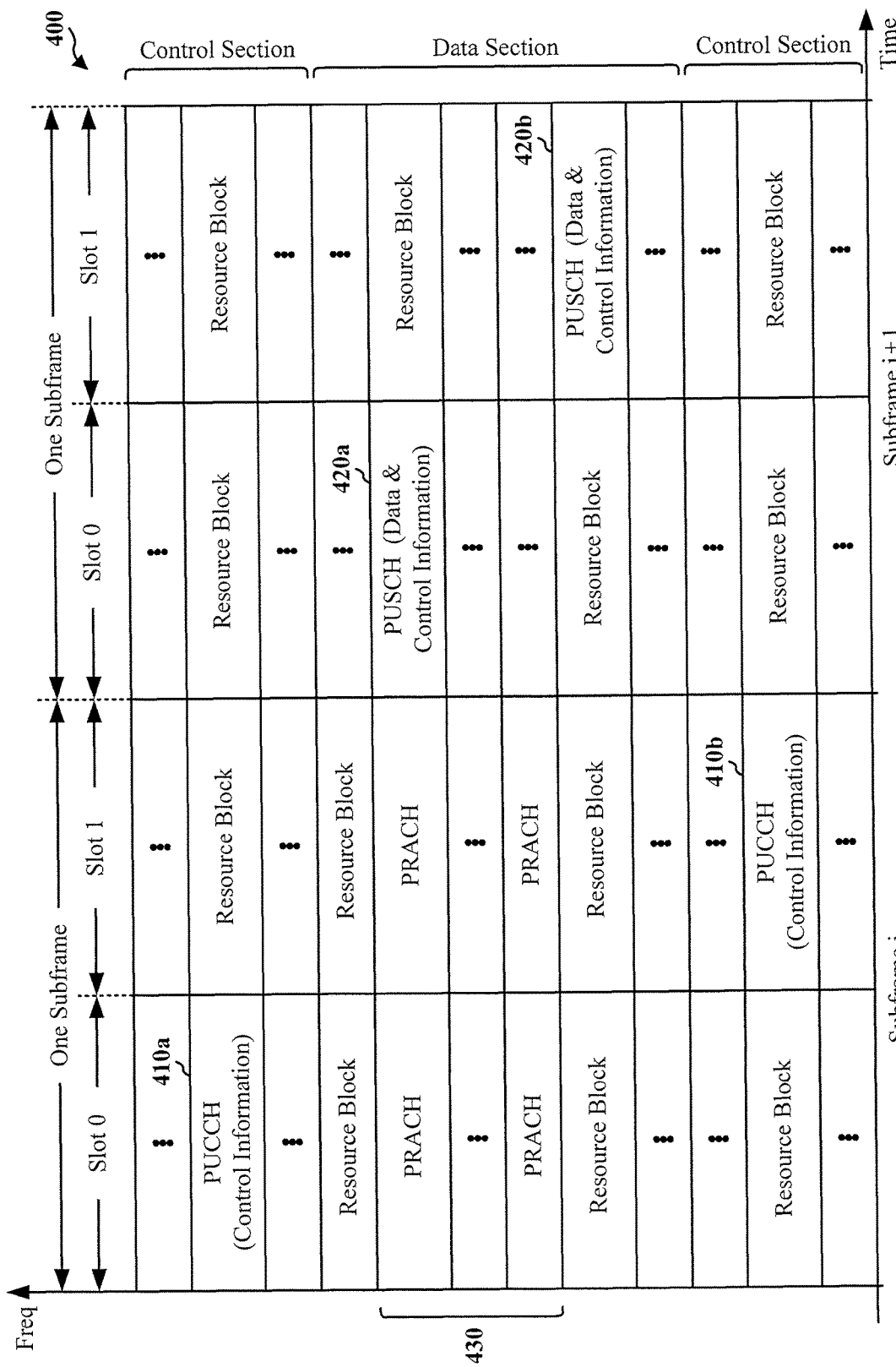
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
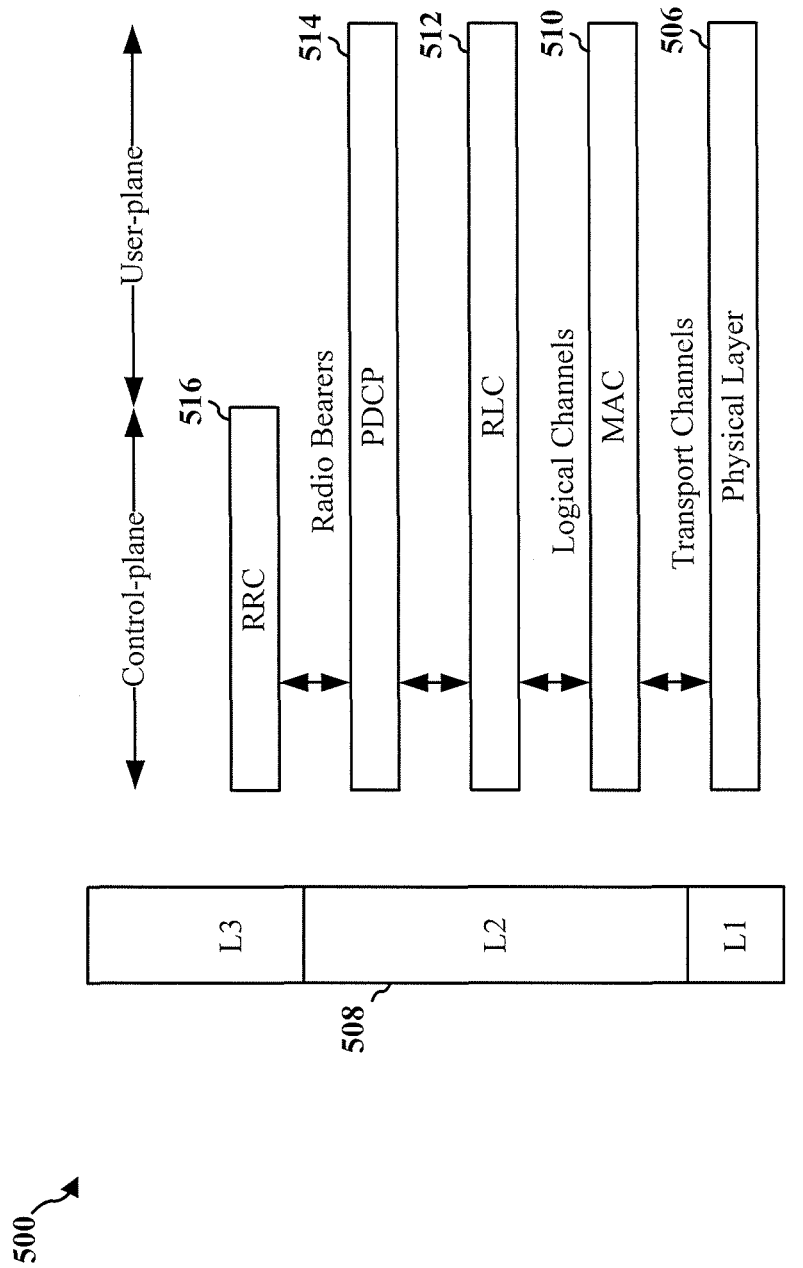
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
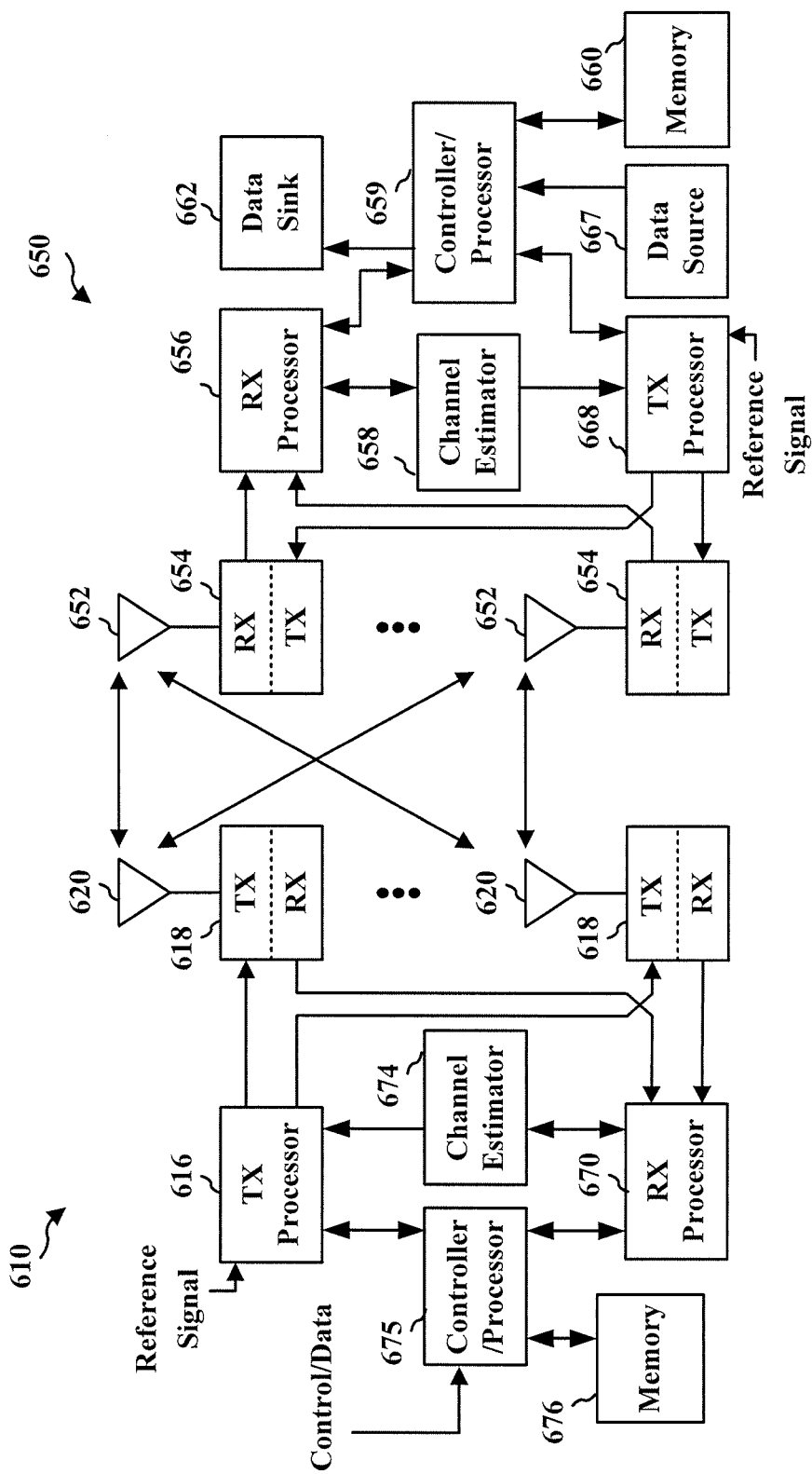
FIG. 6 is a diagram illustrating an example of an evolved Node B and user equipment in an access network.

FIG. 6 is a block diagram of a base station 610 in communication with a UE 650 in an access network. The base station 610 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 650 may be capable of communicating signals via the LTE system and/or the mmW system. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654 RX receives a signal through its respective antenna 652. Each receiver 654 RX recovers information modulated onto an RF carrier and provides the information to receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
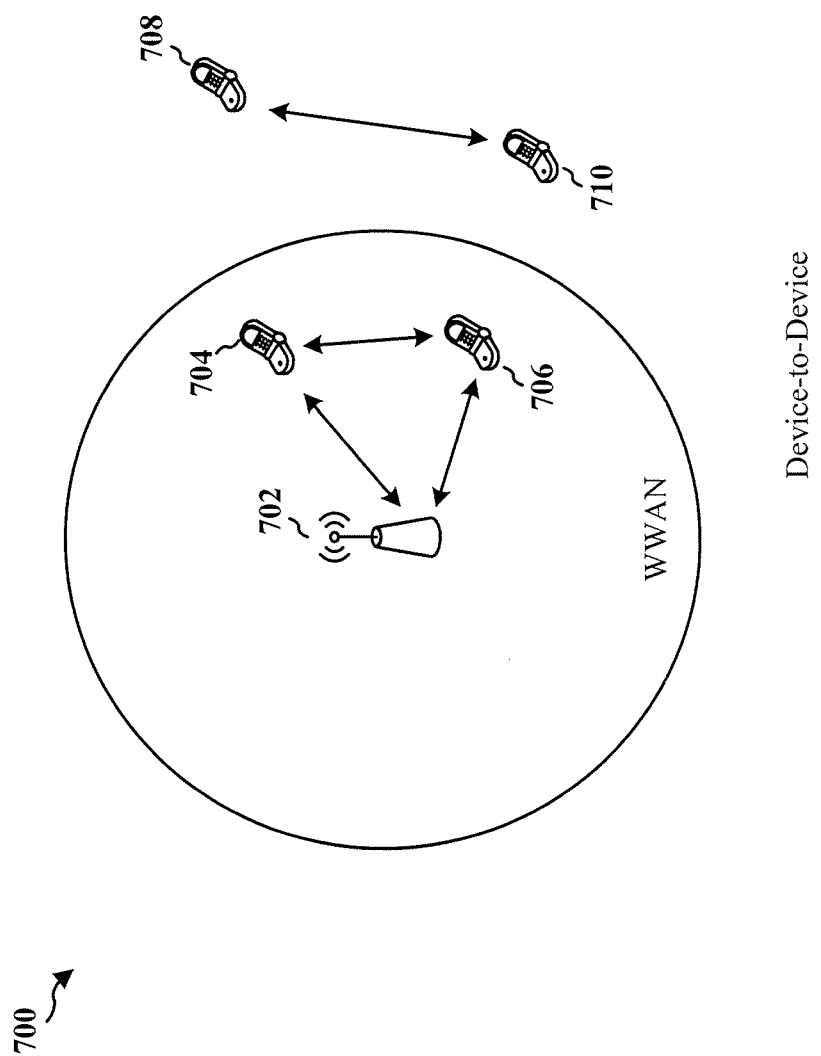
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure exploits the presence of a more robust system to help with beamforming, synchronization, or discovery of a base station. To facilitate cooperation between the mmW system and a lower-frequency system (e.g., LTE), the present disclosure discloses the following: 1) Types of signaling for discovery, synchronization, or association on a mmW channel that can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by connection points (CPs)/user equipments (UEs) in a transmitted message; and 5) Information to be included in LTE signaling.

In an aspect, mmW-capable connection points (CPs) (network access points for mmW-capable devices) may be mounted on light poles, building sides, and/or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 8A:
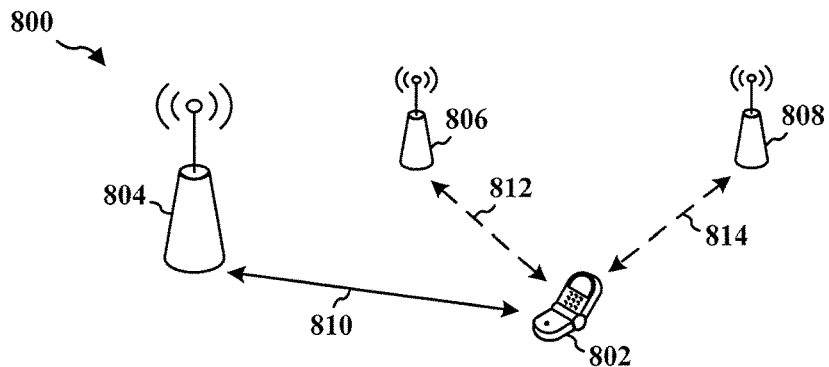
FIGS. 8A to 8C are diagrams illustrating example deployments of a mmW system used in conjunction with a LTE system.
Figure 8B:
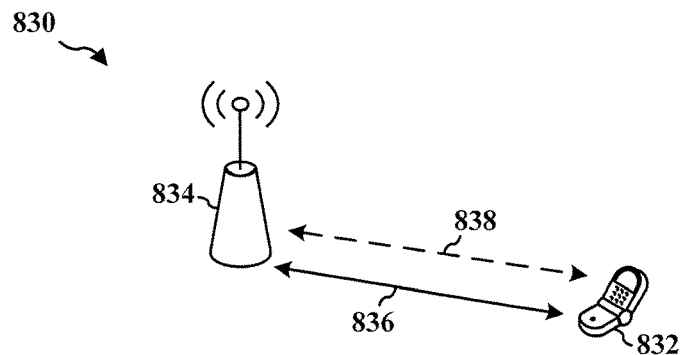
Figure 8C:
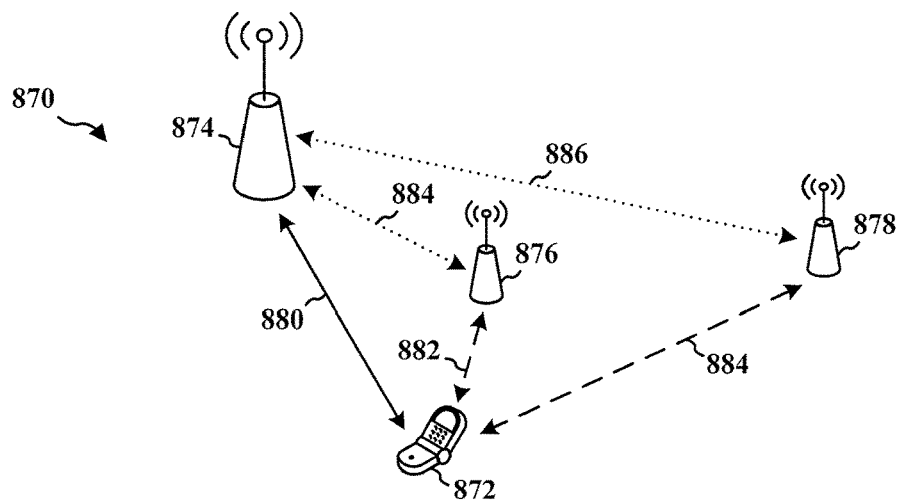

FIGS. 8A to 8C are diagrams illustrating example deployments of a mmW system used in conjunction with a LTE system. In FIG. 8A, diagram 800 illustrates a deployment where a LTE system operates independently of, and in parallel with, a mmW system. As shown in FIG. 8A, a UE 802 is capable of communicating signals via a LTE system and a mmW system. Accordingly, the UE 802 may communicate with an eNB 804 over a LTE link 810. In parallel with the LTE link 810, the UE 802 may also communicate with a first CP 806 over a first mmW link 812 and communicate with a second CP 808 over a second mmW link 814.

In FIG. 8B, diagram 830 illustrates a deployment where the LTE system and the mmW system are collocated. As shown in FIG. 8B, a UE 832 is capable of communicating signals via the LTE system and the mmW system. In an aspect, a base station 834 may be an LTE eNB capable of communicating signals via the LTE system and the mmW system. As such, the base station 834 may be referred to as a LTE+mmW eNB. In another aspect, the base station 834 may be a mmW CP capable of communicating signals via the LTE system and the mmW system. As such, the base station 834 may be referred to as a LTE+mmW CP. The UE 832 may communicate with the base station 834 over a LTE link 836. Meanwhile, the UE 832 may also communicate with the base station 834 over a mmW link 838.

In FIG. 8C, diagram 870 illustrates a deployment where a base station capable of communicating signals via the LTE system and the mmW system (LTE+mmW base station) is present with CPs capable of communicating signals via the mmW system only. As shown in FIG. 8C, a UE 872 may communicate with a LTE+mmW base station 874 over a LTE link 880. The LTE+mmW base station 874 may be a LTE+mmW eNB or a LTE+mmW CP. In parallel with the LTE link 880, the UE 872 may also communicate with a first CP 876 over a first mmW link 882 and communicate with a second CP 878 over a second mmW link 884. The first CP 876 may further communicate with the LTE+mmW base station 874 over a first mmW backhaul link 884. The second CP 878 may further communicate with the LTE+mmW base station 874 over a second mmW backhaul link 886.

Figure 9A:
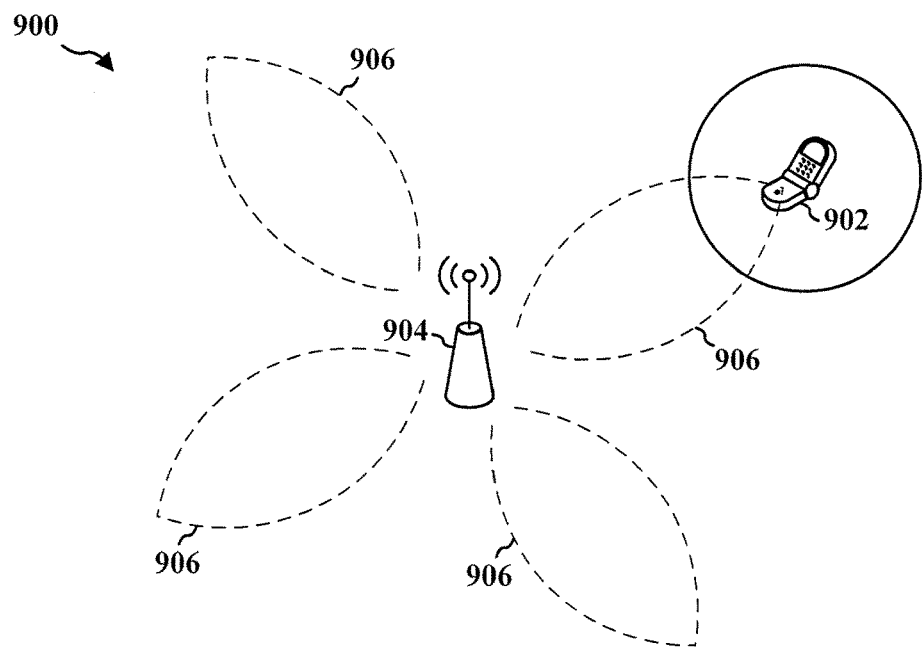
FIGS. 9A and 9B are diagrams illustrating an example of the transmission of beamformed signals between a connection point and a UE.
Figure 9B:
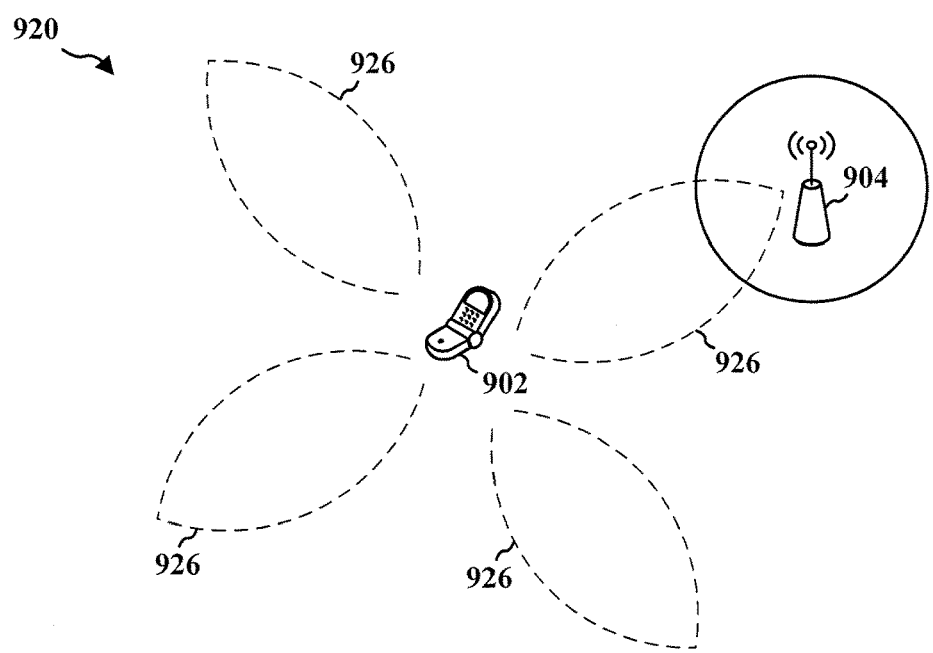

FIGS. 9A and 9B are diagrams illustrating an example of the transmission of beamformed signals between a CP and a UE. Referring to FIG. 9, diagram 900 illustrates a CP 904 of a mmW system transmitting beamformed signals 906 (e.g., synchronization signals or discovery signals) in different transmit directions. After transmitting the signals, the CP 904 may switch to a receive mode. In the receive mode, the CP 904 may sweep through different receive directions in a sequence or pattern corresponding (mapping) to a sequence or pattern in which the CP 904 previously transmitted the synchronization/discovery signals in the different transmit directions. A dwell time on each beamformed signal allows a UE 902 to perform a receive (Rx) sweep. The UE 902 in a receive mode may sweep through different receive directions in an attempt to detect a synchronization/discovery signal 906. One or more of the synchronization/discovery signals 906 may be detected by the UE 902. When a strong synchronization/discovery signal 906 is detected, the UE 902 may determine an optimal transmit direction of the CP 904 and an optimal receive direction of the UE 902 corresponding to the strong synchronization/discovery signal. For example, the UE 902 may determine preliminary antenna weights/directions of the strong synchronization/discovery signal 906, and may further determine a time and/or resource where the CP 904 is expected to optimally receive a beamformed signal. Thereafter, the UE 902 may attempt synchronization/discovery to the CP 904 via a beamformed signal.

Referring to FIG. 9B, the UE 902 may attempt the synchronization/discovery by transmitting beamformed signals 926 (e.g., synchronization/discovery signals) in different transmit directions. In an aspect, the UE 902 may transmit a synchronization/discovery signal 926 by transmitting along the optimal receive direction of the UE 902 at the time/resource where the CP 904 is expected to optimally receive the synchronization/discovery signal. The CP 904 in the receive mode may sweep through different receive directions and detect the synchronization/discovery signal 926 from the UE 902 during one or more timeslots corresponding to a receive direction. When a strong synchronization/discovery signal 926 is detected, the CP 904 may determine an optimal transmit direction of the UE 902 and an optimal receive direction of the CP 904 corresponding to the strong synchronization/discovery signal. For example, the CP 904 may determine preliminary antenna weights/directions of the strong synchronization/discovery signal 926, and may further determine a time and/or resource where the UE 902 is expected to optimally receive a beamformed signal. The process discussed above with respect to FIGS. 9A and 9B may be refined or repeated over time such that the UE 902 and CP 904 eventually learn the most optimal transmit and receive directions for establishing a link with each other.

In an aspect, the CP 904 may choose a sequence or pattern for transmitting the synchronization/discovery signals according to a number of beamforming directions. The CP 904 may then transmit the signals for an amount of time long enough for the UE 902 to sweep through a number of beamforming directions in an attempt to detect a synchronization/discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. Upon detecting a synchronization/discovery signal from the CP 904, the UE 902 may discover that the strongest synchronization/discovery signal is received when the UE 902 beamforming direction is k=2 and the CP 904 beamforming direction is n=3. Accordingly, the UE 902 may use the same antenna weights/directions for responding (transmitting a beamformed signal) to the CP 904 in a corresponding response timeslot. That is, the UE 902 may send a signal to the CP 904 using UE 902 beamforming direction k=2 during a timeslot when the CP 904 is expected to perform a receive sweep at CP 904 beamforming direction n=3.

In an aspect, the operation described above with respect to FIGS. 9A and 9B may be limited by a link budget, at least during the initial stages of the operation, and therefore not robust. Accordingly, a lower-frequency system, such as LTE, may be utilized to accelerate the process. For example, LTE may be used to obtain timing information (or offsets), beamforming periodicities, and/or device capabilities. LTE signaling may provide information regarding how mmW access symbols and timing relate to an LTE frame structure (e.g., offset information). Moreover, LTE channels may be used to signal acknowledgement messages, beam search response messages, etc. In an aspect, if the mmW system is particularly unreliable, a majority of data bits to be communicated from a transmitter to a receiver may be sent over a LTE channel while necessary signatures, pilots, etc. may be sent over a mmW channel to assist synchronization and discovery.

Figure 10:
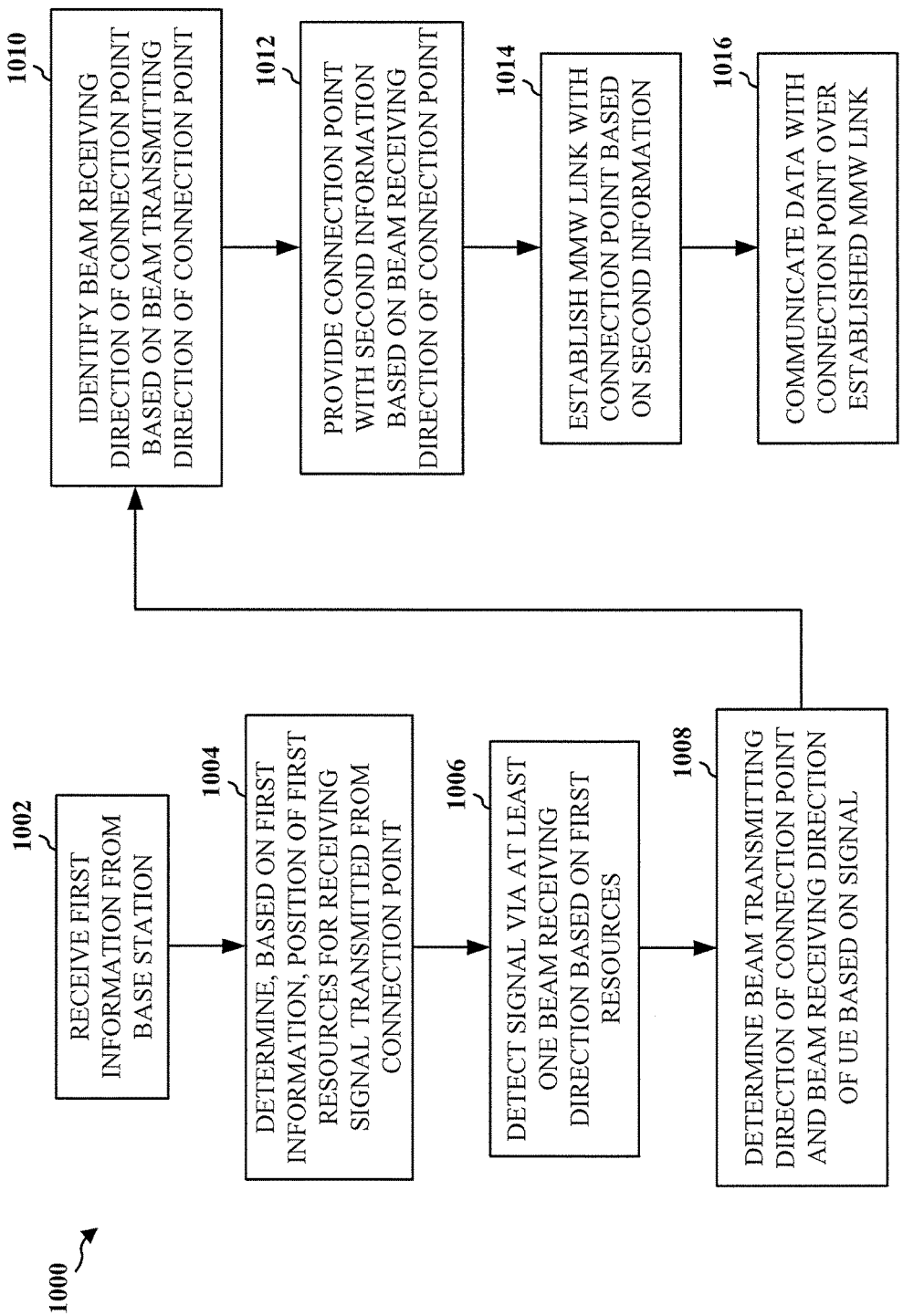
FIG. 10 is a flow chart of a method of wireless communication

FIG. 10 is a flow chart 1000 of a method of wireless communication. The method may be performed by a UE capable of communicating signals via lower-frequency channels (e.g., via a LTE system) and higher-frequency channels (e.g., via a mmW system). At step 1002, the UE receives first information from a base station. In an aspect, the UE receives the first information via a low-frequency channel from an eNB of the LTE system. In a further aspect, the first information may include information related to an order of a beam transmitting direction and a beam receiving direction of a connection point, or information related to a capability of the connection point for transmission and reception.

At step 1004, the UE determines, based on the first information, a position of resources for receiving a signal (e.g., synchronization/discovery signal) transmitted from the connection point. In an aspect, the signal is transmitted from the connection point via a high-frequency channel (via the mmW system). Accordingly, the first information may include timing information for receiving the signal from the connection point via the high-frequency channel. The timing information may include an offset with respect to a LTE system timing. In a further aspect, the signal may include timing information for communicating with the connection point via a low-frequency channel and timing information for communicating with the connection point via a high-frequency channel.

At step 1006, the UE detects the signal via at least one beam receiving direction based on the resources. At step 1008, the UE determines a beam transmitting direction of the connection point and a beam receiving direction of the UE based on the signal. At step 1010, the UE identifies a beam receiving direction of the connection point based on the beam transmitting direction of the connection point.

At step 1012, the UE provides the connection point with second information based on the beam receiving direction of the connection point. The second information may include an intent to establish a millimeter-wave (mmW) link with the connection point, the beam receiving direction of the UE, the beam transmitting direction of the connection point, a beam response indicating a link quality (e.g., received signal strength indicator (RSSI) or signal-to-interference-plus-noise ratio (SINR)), and/or information indicating capabilities of the UE. In an aspect, the second information is provided to the connection point via a low-frequency channel and/or a high-frequency channel. Accordingly, the first information may include frequency information for providing the second information to the connection point via the low-frequency channel.

At step 1014, the UE establishes the mmW link with the connection point based on the second information. Thereafter, at step 1016, the UE communicates data with the connection point over the established mmW link.

Figure 11:
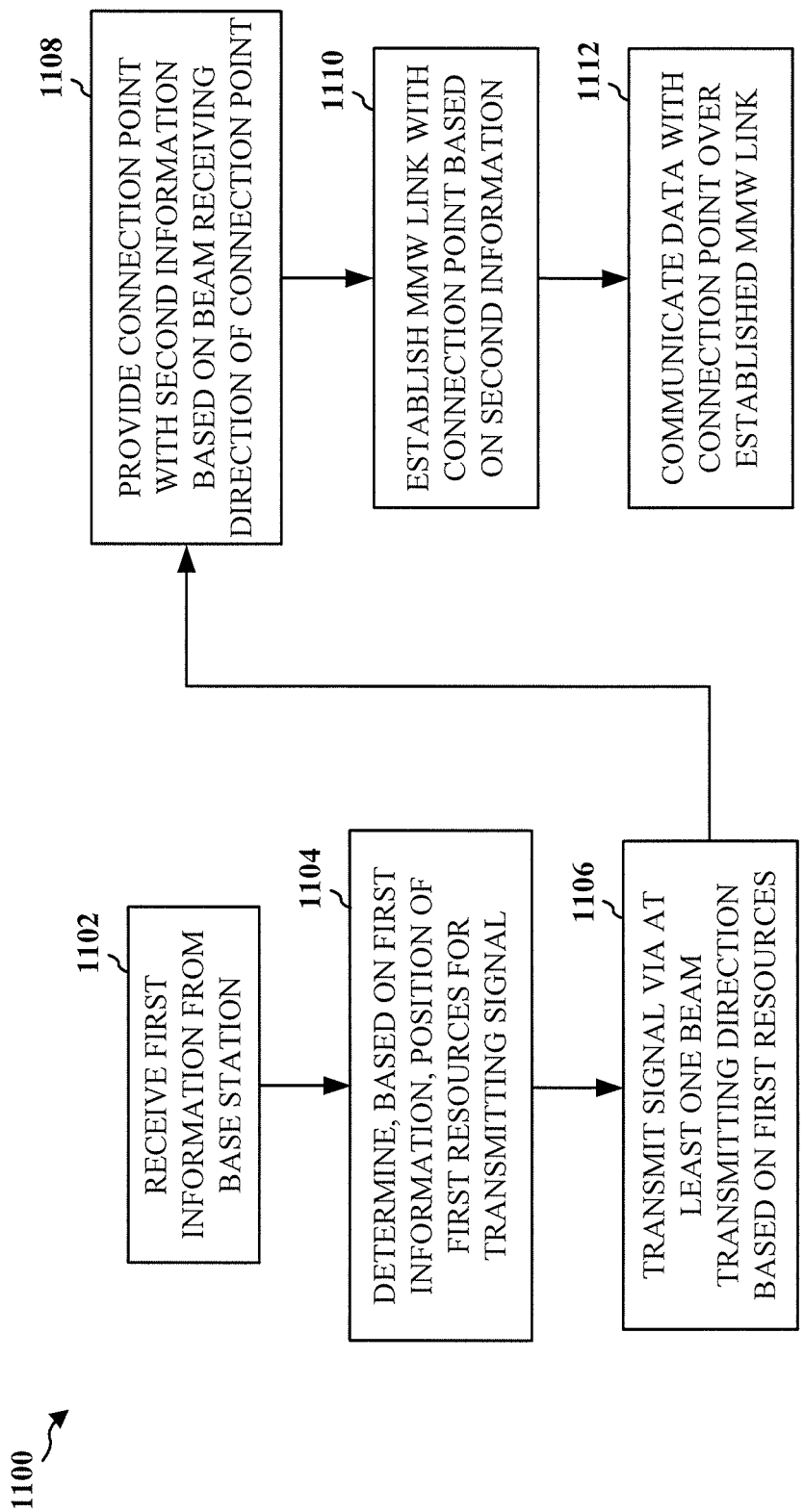
FIG. 11 is a flow chart of a method of wireless communication.

FIG. 11 is a flow chart 1100 of a method of wireless communication. The method may be performed by a connection point capable of communicating signals via lower-frequency channels (e.g., via a LTE system) and higher-frequency channels (e.g., via a mmW system). At step 1102, the connection point receives first information from a base station. In an aspect, the connection point receives the first information via a low-frequency channel from an eNB of the LTE system. The first information may include information related to an order of a beam transmitting direction and a beam receiving direction of a user equipment (UE), or information related to a capability of the UE for transmission and reception.

At step 1104, the connection point determines, based on the first information, a position of resources for transmitting a signal (e.g., synchronization/discovery signal). In an aspect, the signal is transmitted via a high-frequency channel (via the mmW system). Accordingly, the first information may include timing information for transmitting the signal via the high-frequency channel. The timing information may include an offset with respect to a LTE system timing. In a further aspect, the signal may include timing information for communicating with the connection point via a low-frequency channel and timing information for communicating with the connection point via a high-frequency channel.

At step 1106, the connection point transmits the signal via at least one beam transmitting direction based on the resources. At step 1108, the connection point receives second information from the UE in response to the signal. The second information may include an intent of the UE to establish a mmW link with the connection point, a beam receiving direction of the UE, a beam transmitting direction of the connection point determined by the UE, a beam response indicating a link quality (e.g., received signal strength indicator (RSSI) or signal-to-interference-plus-noise ratio (SINR)), and/or information indicating capabilities of the UE.

In an aspect, the second information may be received from the UE via a low-frequency channel and/or a high-frequency channel. Accordingly, the first information may include frequency information for receiving the second information from the UE via the low-frequency channel. In a further aspect, the second information is received from the UE along a direction based on a beam transmitting direction of the signal.

At step 1110, the connection point establishes the mmW link with the UE based on the second information. Thereafter, the connection point communicates data with the UE over the established mmW link.

Figure 12:
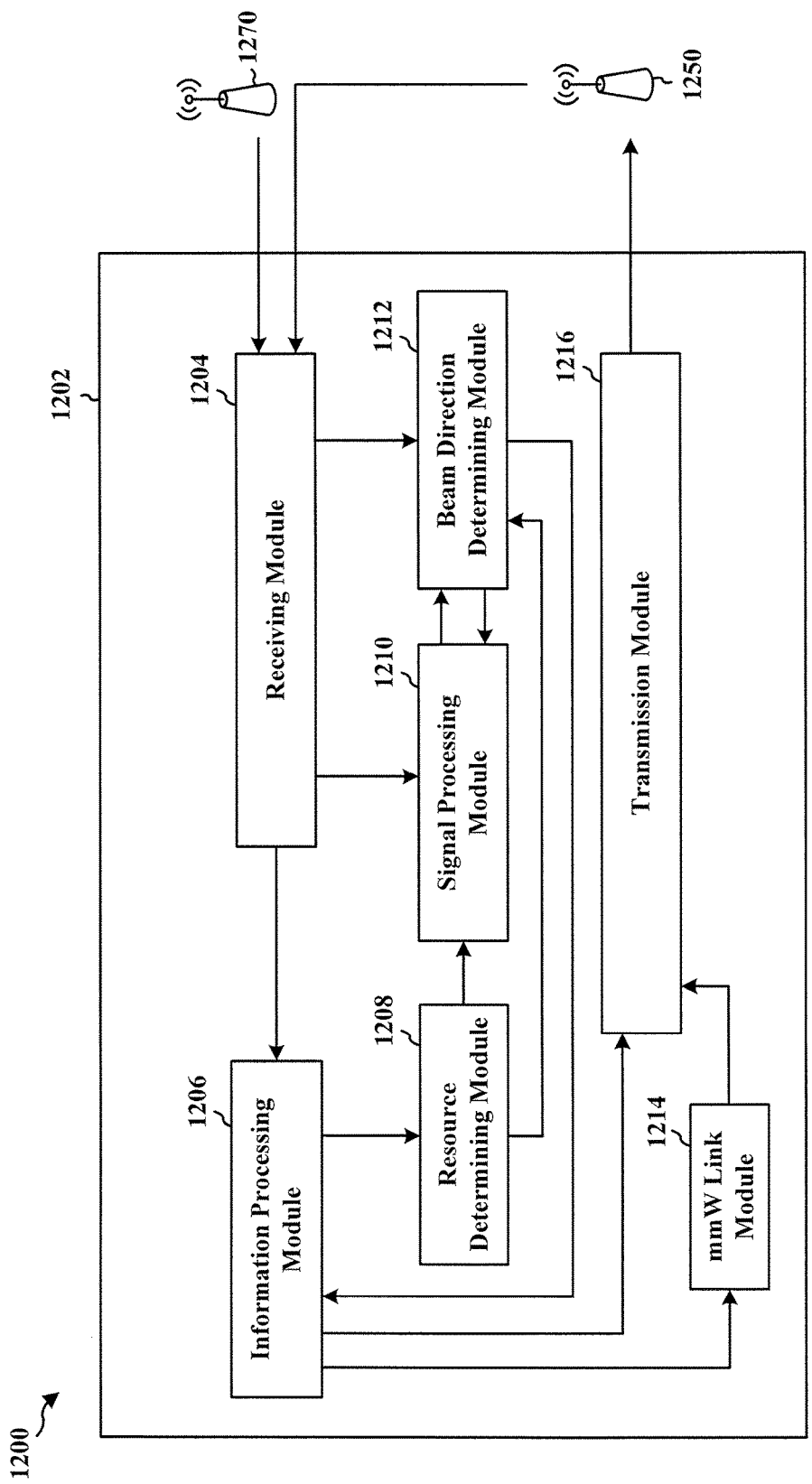
FIG. 12 is a data flow diagram illustrating the data flow between different modules/means/components in an exemplary apparatus.

FIG. 12 is a conceptual data flow diagram 1200 illustrating the data flow between different modules/means/components in an exemplary apparatus 1202 (e.g., UE) capable of communicating signals via lower-frequency channels (e.g., via a LTE system) and higher-frequency channels (e.g., via a mmW system). The apparatus includes a receiving module 1204, an information processing module 1206, a resource determining module 1208, a signal processing module 1210, a beam direction determining module 1212, a mmW link module 1214, and a transmission module 1216.

The information processing module 1206 receives (via the receiving module 1204) first information from a base station 1270. In an aspect, the information processing module 1206 receives the first information via a low-frequency channel from an eNB of the LTE system. In a further aspect, the first information may include information related to an order of a beam transmitting direction and a beam receiving direction of a connection point 1250, or information related to a capability of the connection point 1250 for transmission and reception.

The resource determining module 1208 determines, based on the first information, a position of resources for receiving a signal (e.g., synchronization/discovery signal) transmitted from the connection point 1250. In an aspect, the signal is transmitted from the connection point 1250 via a high-frequency channel (via the mmW system). Accordingly, the first information may include timing information for receiving the signal from the connection point 1250 via the high-frequency channel. The timing information may include an offset with respect to a LTE system timing. In a further aspect, the signal may include timing information for communicating with the connection point 1250 via a low-frequency channel and timing information for communicating with the connection point 1250 via a high-frequency channel.

The signal processing module detects (via the receiving module 1204) the signal via at least one beam receiving direction determined by the beam direction determining module 1212 based on the resources. The beam direction determining module 1212 determines a beam transmitting direction of the connection point 1250 and a beam receiving direction of the apparatus 1202 based on the signal. The beam direction determining module 1212 also identifies a beam receiving direction of the connection point 1250 based on the beam transmitting direction of the connection point 1250.

The information processing module 1206 provides (via the transmission module 1216) the connection point 1250 with second information based on the beam receiving direction of the connection point 1250. The second information may include an intent to establish a millimeter-wave (mmW) link with the connection point 1250, the beam receiving direction of the apparatus 1202, the beam transmitting direction of the connection point 1250, a beam response indicating a link quality (e.g., received signal strength indicator (RSSI) or signal-to-interference-plus-noise ratio (SINR)), and/or information indicating capabilities of the apparatus 1202. In an aspect, the second information is provided to the connection point 1250 via a low-frequency channel and/or a high-frequency channel. Accordingly, the first information may include frequency information for providing the second information to the connection point 1250 via the low-frequency channel.

The mmW link module 1214 establishes the mmW link with the connection point 1250 based on the second information. Thereafter, the information processing module 1206 and/or the mmW link module 1214 communicates (via the transmission module 1216) data with the connection point 1250 over the established mmW link.

The apparatus may include additional modules that perform each of the steps illustrated in the aforementioned flow charts of FIG. 10. As such, each step in the aforementioned flow chart of FIG. 10 may be performed by a module and the apparatus may include one or more of those modules. The modules may be one or more hardware components specifically configured to carry out the stated processes, implemented by a processor configured to perform the stated processes, stored within a computer-readable medium for implementation by a processor, or some combination thereof.

Figure 13:
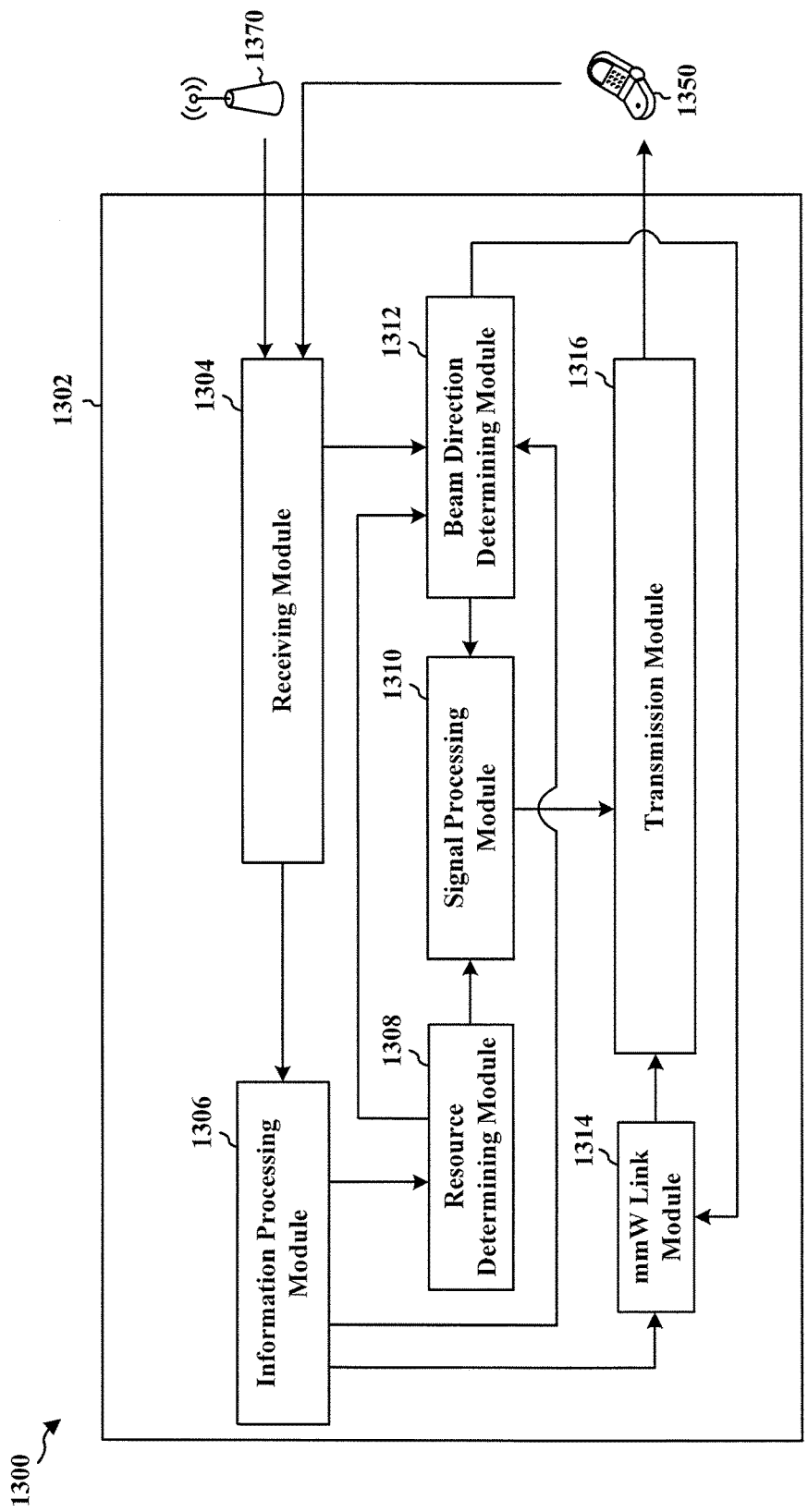
FIG. 13 is a data flow diagram illustrating the data flow between different modules/means/components in an exemplary apparatus.

FIG. 13 is a conceptual data flow diagram 1300 illustrating the data flow between different modules/means/components in an exemplary apparatus 1302 (e.g., connection point) capable of communicating signals via lower-frequency channels (e.g., via a LTE system) and higher-frequency channels (e.g., via a mmW system). The apparatus includes a receiving module 1304, an information processing module 1306, a resource determining module 1308, a signal processing module 1310, a beam direction determining module 1312, a mmW link module 1314, and a transmission module 1316.

The information processing module 1306 receives (via the receiving module 1304) first information from a base station 1370. In an aspect, the information processing module 1306 receives the first information via a low-frequency channel from an eNB of the LTE system. The first information may include information related to an order of a beam transmitting direction and a beam receiving direction of a user equipment (UE) 1350, or information related to a capability of the UE 1350 for transmission and reception.

The resource determining module 1308 determines, based on the first information, a position of resources for transmitting a signal (e.g., synchronization/discovery signal). In an aspect, the signal is transmitted via a high-frequency channel (via the mmW system). Accordingly, the first information may include timing information for transmitting the signal via the high-frequency channel. The timing information may include an offset with respect to a LTE system timing. In a further aspect, the signal may include timing information for communicating with the apparatus 1302 via a low-frequency channel and timing information for communicating with the apparatus 1302 via a high-frequency channel.

The signal processing module 1310 transmits (via the transmission module 1310) the signal via at least one beam transmitting direction determined by the beam direction determining module 1312 based on the resources. The information processing module receives (via the receiving module 1304) second information from the UE 1350 in response to the signal. The second information may include an intent of the UE 1350 to establish a mmW link with the apparatus 1302, a beam receiving direction of the UE 1350, a beam transmitting direction of the apparatus 1302 determined by the UE 1350, a beam response indicating a link quality (e.g., received signal strength indicator (RSSI) or signal-to-interference-plus-noise ratio (SINR)), or information indicating capabilities of the UE 1350.

In an aspect, the second information may be received from the UE 1350 via a low-frequency channel and/or a high-frequency channel. Accordingly, the first information may include frequency information for receiving the second information from the UE 1350 via the low-frequency channel. In a further aspect, the second information is received from the UE 1350 along a direction based on a beam transmitting direction of the signal.

The mmW link module 1314 establishes the mmW link with the UE 1350 based on the second information. Thereafter, the information processing module 1306 and/or the mmW link module 1314 communicates (via the transmission module 1316) data with the UE 1350 over the established mmW link.

The apparatus may include additional modules that perform each of the steps illustrated in the aforementioned flow charts of FIG. 11. As such, each step in the aforementioned flow chart of FIG. 11 may be performed by a module and the apparatus may include one or more of those modules. The modules may be one or more hardware components specifically configured to carry out the stated processes, implemented by a processor configured to perform the stated processes, stored within a computer-readable medium for implementation by a processor, or some combination thereof.

Figure 14:
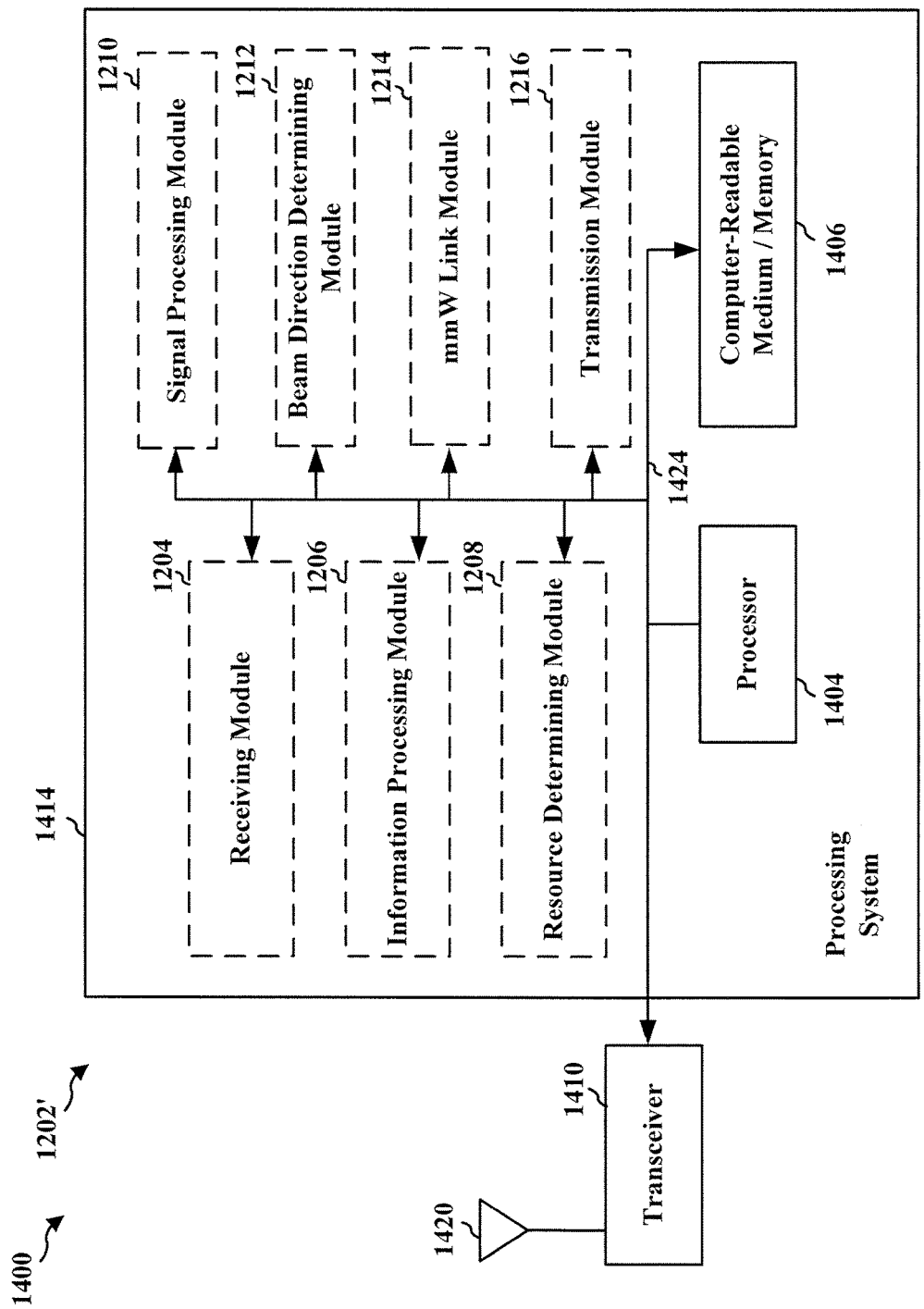
FIG. 14 is a diagram illustrating an example of a hardware implementation for an apparatus employing a processing system.

FIG. 14 is a diagram 1400 illustrating an example of a hardware implementation for an apparatus 1202' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1204, 1206, 1208, 1210, 1212, 1214, 1216, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1204. In addition, the transceiver 1410 receives information from the processing system 1414, specifically the transmission module 1216, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1204, 1206, 1208, 1210, 1212, 1214, and 1216. The modules may be software modules running in the processor 1404, resident/stored in the computer readable medium/memory 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1202/1202' for wireless communication includes means for receiving first information from a base station; means for determining, based on the first information, a position of resources for receiving a signal transmitted from a connection point; means for detecting the signal via at least one beam receiving direction based on the resources; means for determining a beam transmitting direction of the connection point and a beam receiving direction of the UE based on the signal; means for identifying a beam receiving direction of the connection point based on the beam transmitting direction of the connection point; means for providing the connection point with second information based on the beam receiving direction of the connection point, the second information comprising at least one of: an intent to establish a millimeter-wave (mmW) link with the connection point, the beam receiving direction of the UE, the beam transmitting direction of the connection point, a beam response indicating a link quality (e.g., received signal strength indicator (RSSI) or signal-to-interference-plus-noise ratio (SINR)), or information indicating capabilities of the UE; means for establishing the mmW link with the connection point based on the second information; and means for communicating data with the connection point over the established mmW link.

The aforementioned means may be one or more of the aforementioned modules of the apparatus 1202 and/or the processing system 1414 of the apparatus 1202' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 15:
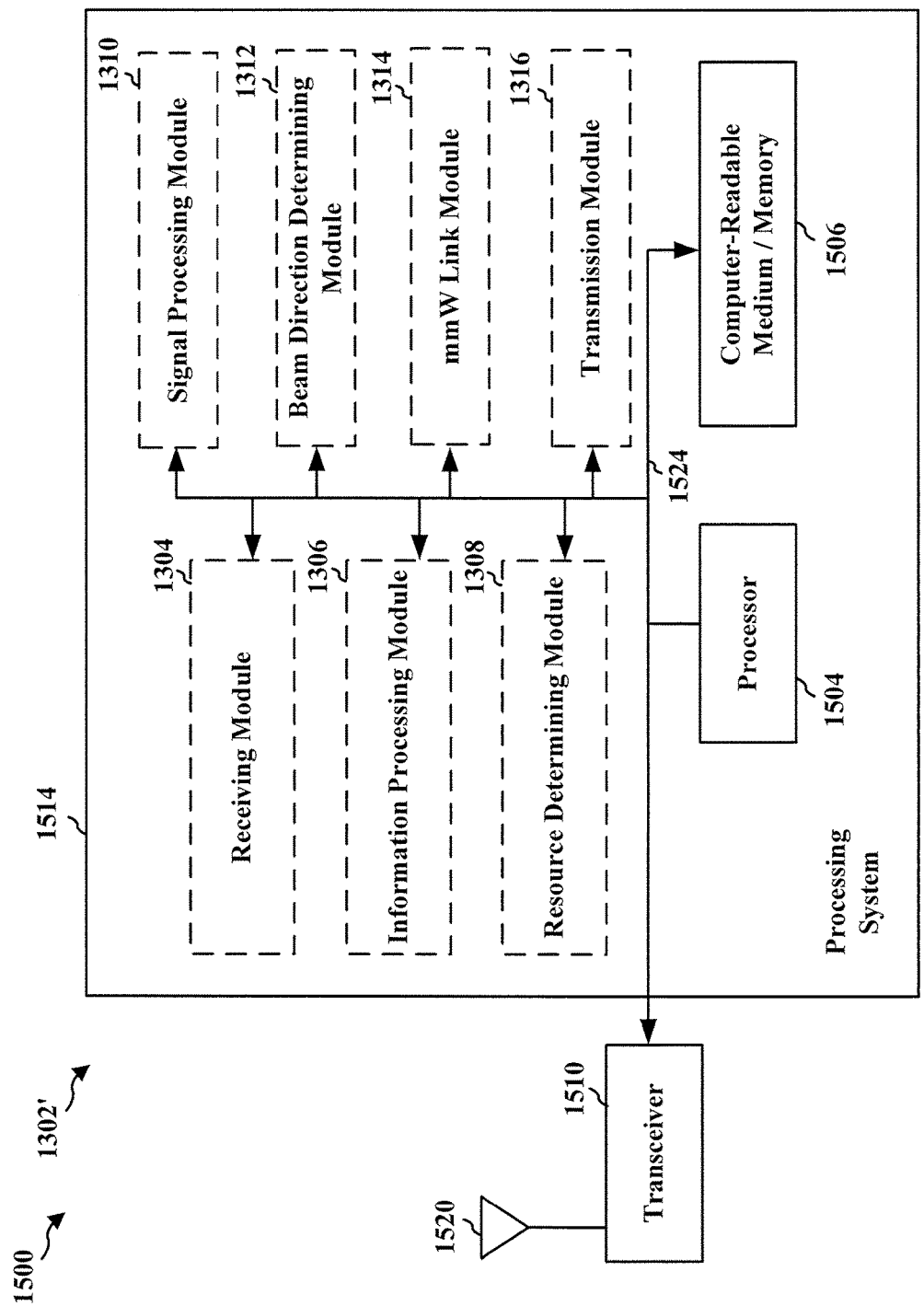
FIG. 15 is a diagram illustrating an example of a hardware implementation for an apparatus employing a processing system.

FIG. 15 is a diagram 1500 illustrating an example of a hardware implementation for an apparatus 1302' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1304, 1306, 1308, 1310, 1312, 1314, 1316 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1304. In addition, the transceiver 1510 receives information from the processing system 1514, specifically the transmission module 1316, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1304, 1306, 1308, 1310, 1312, 1314, and 1316. The modules may be software modules running in the processor 1504, resident/stored in the computer readable medium/memory 1506, one or more hardware modules coupled to the processor 1504, or some combination thereof. The processing system 1514 may be a component of the base station 610 and may include the memory 676 and/or at least one of the TX processor 616, the RX processor 670, and the controller/processor 675.

In one configuration, the apparatus 1302/1302' for wireless communication includes means for receiving first information from a base station; means for determining, based on the first information, a position of resources for transmitting a signal; means for transmitting the signal via at least one beam transmitting direction based on the resources; means for receiving second information from a user equipment (UE) in response to the signal, the second information comprising at least one of: an intent of the UE to establish a millimeter-wave (mmW) link with the connection point, a beam receiving direction of the UE, a beam transmitting direction of the connection point determined by the UE, a beam response indicating a link quality (e.g., received signal strength indicator (RSSI) or signal-to-interference-plus-noise ratio (SINR)), or information indicating capabilities of the UE; means for establishing the mmW link with the UE based on the second information; and means for communicating data with the UE over the established mmW link.

The aforementioned means may be one or more of the aforementioned modules of the apparatus 1302 and/or the processing system 1514 of the apparatus 1302' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   receiving, via a first network, first information from a base station of the first network;
   determining, based on the first information received via the first network, a position of resources for receiving a signal transmitted from a connection point of a second network via the second network, the connection point being an access point of the second network, the second network having a higher frequency than the first network;
   detecting the signal via at least one beam receiving direction based on the resources;
   determining a beam transmitting direction of the connection point and a beam receiving direction of the UE based on the signal;
   identifying a beam receiving direction of the connection point based on the beam transmitting direction of the connection point; and
   providing, from the UE to the connection point, second information based on the beam receiving direction of the connection point, the second information comprising at least two of:
      an intent to establish a millimeter-wave (mmW) link with the connection point,
      the beam receiving direction of the UE, or
      the beam transmitting direction of the connection point.

2. The method of claim 1, further comprising:
   establishing the mmW link with the connection point based on the second information; and
   communicating data with the connection point over the established mmW link.

3. The method of claim 1, wherein:
the first information from the base station is received via a low-frequency channel; and
the signal is transmitted from the connection point via a high-frequency channel.

4. The method of claim 3, wherein the first information comprises timing information for receiving the signal from the connection point via the high-frequency channel.

5. The method of claim 4, wherein the timing information comprises an offset with respect to a Long Term Evolution (LTE) system timing.

6. The method of claim 1, wherein the second information is provided to the connection point via at least one of a low-frequency channel or a high-frequency channel, and
wherein the first information comprises frequency information for providing the second information to the connection point via the low-frequency channel.

7. The method of claim 1, wherein the signal comprises:
timing information for communicating with the connection point via a low-frequency channel; and
timing information for communicating with the connection point via a high-frequency channel.

8. The method of claim 1, wherein the first information comprises:
information related to an order of the beam transmitting direction and the beam receiving direction of the connection point, or
information related to a capability of the connection point for transmission and reception.

9. The method of claim 1, wherein the second information further comprises at least one of:
a beam response indicating a link quality; or
UE capability information.

10. The method of claim 1, wherein providing from the UE to the connection point second information based on the beam receiving direction of the connection point comprises:
determining a time slot during which the connection point is expected to perform a receive sweep in the beam transmitting direction of the connection point; and
transmitting the second information during the determined timeslot.

11. A method of wireless communication of a connection point, comprising:
receiving, via a first network, first information from a base station of a first network;
determining, based on the first information received via the first network, a position of resources for transmitting a signal from the connection point via a second network, the connection point being an access point of the second network, the second network having a higher frequency than the first network;
transmitting the signal via at least one beam transmitting direction based on the resources; and
receiving second information from a user equipment (UE) in response to the signal, the second information comprising at least two of:
an intent of the UE to establish a millimeter-wave (mmW) link with the connection point,
a beam receiving direction of the UE, or
a beam transmitting direction of the connection point determined by the UE.

12. The method of claim 11, further comprising:
establishing the mmW link with the UE based on the second information; and
communicating data with the UE over the established mmW link.

13. The method of claim 11, wherein:
the first information from the base station is received via a low-frequency channel; and
the signal is transmitted via a high-frequency channel.

14. The method of claim 13, wherein the first information comprises timing information for transmitting the signal via the high-frequency channel.

15. The method of claim 14, wherein the timing information comprises an offset with respect to a Long Term Evolution (LTE) system timing.

16. The method of claim 11, wherein the second information is received from the UE via at least one of a low-frequency channel or a high-frequency channel, and
wherein the first information comprises frequency information for receiving the second information from the UE via the low-frequency channel.

17. The method of claim 11, wherein the signal comprises:
timing information for communicating with the connection point via a low-frequency channel; and
timing information for communicating with the connection point via a high-frequency channel.

18. The method of claim 11, wherein the second information is received from the UE along a direction based on a beam transmitting direction of the signal.

19. The method of claim 11, wherein the first information comprises:
information related to an order of a beam transmitting direction and the beam receiving direction of the UE, or
information related to a capability of the UE for transmission and reception.

20. The method of claim 11, wherein the second information further comprises at least one of:
a beam response indicating a link quality; or
UE capability information.

21. A user equipment (UE) for wireless communication, comprising:
means for receiving, via a first network, first information from a base station of the first network;
means for determining, based on the first information received via the first network, a position of resources for receiving a signal transmitted from a connection point of a second network via the second network, the connection point being an access point of the second network, the second network having a higher frequency than the first network;
means for detecting the signal via at least one beam receiving direction based on the resources;
means for determining a beam transmitting direction of the connection point and a beam receiving direction of the UE based on the signal;
means for identifying a beam receiving direction of the connection point based on the beam transmitting direction of the connection point;
means for providing the connection point with second information based on the beam receiving direction of the connection point, the second information comprising at least two of:
an intent to establish a millimeter-wave (mmW) link with the connection point,
the beam receiving direction of the UE, or
a beam response indicating a link quality;
means for establishing the mmW link with the connection point based on the second information; and
means for communicating data with the connection point over the established mmW link.

22. The UE of claim 21, wherein:
the first information from the base station is received via a low-frequency channel;

the signal is transmitted from the connection point via a high-frequency channel;

the first information comprises timing information for receiving the signal from the connection point via the high-frequency channel; and the timing information comprises an offset with respect to a Long Term Evolution (LTE) system timing.

23. The UE of claim 21, wherein the second information is provided to the connection point via at least one of a low-frequency channel or a high-frequency channel, and wherein the first information comprises frequency information for providing the second information to the connection point via the low-frequency channel.

24. The UE of claim 21, wherein the signal comprises:

timing information for communicating with the connection point via a low-frequency channel; and timing information for communicating with the connection point via a high-frequency channel.

25. The UE of claim 21, wherein the first information comprises:

information related to an order of the beam transmitting direction and the beam receiving direction of the connection point, or information related to a capability of the connection point for transmission and reception.

26. A connection point for wireless communication, comprising:

means for receiving, via a first network, first information from a base station of a first network;

means for determining, based on the first information received via the first network, a position of resources for transmitting a signal from the connection point via a second network, the connection point being an access point of the second network, the second network having a higher frequency than the first network;

means for transmitting the signal via at least one beam transmitting direction based on the resources;

means for receiving second information from a user equipment (UE) in response to the signal, the second information comprising at least two of:

an intent of the UE to establish a millimeter-wave (mmW) link with the connection point, a beam receiving direction of the UE, or a beam response indicating a link quality;

means for establishing the mmW link with the UE based on the second information; and means for communicating data with the UE over the established mmW link.

27. The connection point of claim 26, wherein:

the first information from the base station is received via a low-frequency channel;

the signal is transmitted via a high-frequency channel;

the first information comprises timing information for transmitting the signal via the high-frequency channel; and the timing information comprises an offset with respect to a Long Term Evolution (LTE) system timing.

28. The connection point of claim 26, wherein the second information is received from the UE via at least one of a low-frequency channel or a high-frequency channel, and wherein the first information comprises frequency information for receiving the second information from the UE via the low-frequency channel.

29. The connection point of claim 26, wherein the second information is received from the UE along a direction based on a beam transmitting direction of the signal.

30. The connection point of claim 26, wherein the first information comprises:

information related to an order of a beam transmitting direction and the beam receiving direction of the UE, or information related to a capability of the UE for transmission and reception.

\* \* \* \* \*